US010554960B2

(12) United States Patent
Wang et al.

(10) Patent No.: US 10,554,960 B2
(45) Date of Patent: Feb. 4, 2020

(54) UNASSISTED STEREOSCOPIC DISPLAY DEVICE USING DIRECTIONAL BACKLIGHT STRUCTURE

(71) Applicant: NANJING UNIVERSITY, Jiangsu (CN)

(72) Inventors: Yuanqing Wang, Nanjing (CN); Bin Xu, Nanjing (CN); Iingli Zhan, Nanjing (CN); Yalan Xue, Nanjing (CN)

(73) Assignee: Nanjing University, Nanjing (CN)

( * ) Notice: Subject to any disclaimer, the term of this patent is extended or adjusted under 35 U.S.C. 154(b) by 575 days.

(21) Appl. No.: 14/764,551

(22) PCT Filed: May 29, 2014

(86) PCT No.: PCT/CN2014/078766
§ 371 (c)(1),
(2) Date: Jul. 29, 2015

(87) PCT Pub. No.: WO2015/078161
PCT Pub. Date: Jun. 4, 2015

(65) Prior Publication Data
US 2016/0105665 A1    Apr. 14, 2016

(30) Foreign Application Priority Data

Nov. 27, 2013  (CN) .......................... 2013 1 0612559

(51) Int. Cl.
*H04N 13/32*    (2018.01)
*H04N 13/315*   (2018.01)
(Continued)

(52) U.S. Cl.
CPC .......... *H04N 13/32* (2018.05); *H04N 13/315* (2018.05); *H04N 13/383* (2018.05); *H04N 13/398* (2018.05)

(58) Field of Classification Search
CPC . H04N 13/0468–0484; H04N 13/0014; H04N 13/31; H04N 13/312; H04N 13/315;
(Continued)

(56) References Cited

U.S. PATENT DOCUMENTS 6,023,277 A * 2/2000 Osaka ................ G02B 27/2214
345/419
6,160,527 A * 12/2000 Morishima ........ G02B 27/2214
345/7
(Continued)

FOREIGN PATENT DOCUMENTS

CN         103605211 A      2/2014

*Primary Examiner* — Dong Hui Liang
(74) *Attorney, Agent, or Firm* — Treasure IP Group, LLC (57) ABSTRACT

An unassisted stereoscopic display device using a directional backlight structure to produce a stereographic display effect. According to a time-division principle, the display device alternately displays left and right images viewed by the left and right eyes of a viewer. A video field synchronization time sequence is used to control an on-off time sequence of light-emitting units of the directional backlight structure, and when the left image is displayed, only the light-emitting unit corresponding to the left eye of the viewer is lightened, and when the right image is displayed, only the light-emitting unit corresponding to the right eye of the viewer is lightened, such that the left eye of the viewer can only view the left image and the right eye thereof can only view the right image. Binocular parallax images are fused to form a stereoscopic image without a loss of resolution.

7 Claims, 6 Drawing Sheets

Component 1 represents light-emitting units, 2 represents light condenser, 3 represents the mirror, 4 represents the imaging lens, 5 represents the light refractive deflector, 6 represents the LCD screen, 7 represents the pupil tracker, 8 represents the viewing angle extender, 9 represents the directional optical module, 10 represents the LED light-emitting units array, 11 represents the emitted beam, 12 represents the flat fan-shaped beam, 13 represents the exit pupils, M represents the directional backlight module, I represents the virtual image point, Q represents the viewing area, U represents the object distance, V' represents the virtual image distance, V represents the best viewing distance, I' represents the spacing distance between adjacent exit pupils, i' represents the spacing distance between adjacent virtual image point, t represents the spacing distance between the adjacent light-emitting units, W represents the width of the exit pupils, d represents the width of each light-emitting unit, A, B represents the viewer's viewpoint.

(51) Int. Cl.
*H04N 13/383* (2018.01)
*H04N 13/398* (2018.01)

(58) Field of Classification Search
CPC .. H04N 13/317; H04N 13/322; H04N 13/366; H04N 13/383
See application file for complete search history.

(56) References Cited

U.S. PATENT DOCUMENTS

| | | | | |
|---|---|---|---|---|
| 2002/0051118 | A1* | 5/2002 | Takagi | G02B 27/017 351/211 |
| 2003/0025995 | A1* | 2/2003 | Redert | H04N 13/305 359/464 |
| 2003/0117793 | A1* | 6/2003 | Shin | G02B 6/0025 362/609 |
| 2003/0197933 | A1* | 10/2003 | Sudo | H04N 13/021 359/464 |
| 2005/0275942 | A1* | 12/2005 | Hartkop | H04N 13/0409 359/464 |
| 2008/0231951 | A1* | 9/2008 | De Zwart | H04N 13/0415 359/463 |
| 2008/0246753 | A1* | 10/2008 | Amroun | G02B 27/01 345/214 |
| 2009/0282429 | A1* | 11/2009 | Olsson | H04N 13/0477 725/10 |
| 2010/0214634 | A1* | 8/2010 | Kroll | G02B 5/045 359/9 |
| 2011/0157169 | A1* | 6/2011 | Bennett | G06F 3/14 345/419 |
| 2011/0234605 | A1* | 9/2011 | Smith | G02B 27/2214 345/522 |
| 2011/0316985 | A1* | 12/2011 | Ishikawa | G02B 27/2214 348/51 |
| 2012/0026161 | A1* | 2/2012 | Chen | G02B 5/06 345/419 |
| 2012/0154378 | A1* | 6/2012 | Kitchens | H04N 13/0468 345/419 |
| 2013/0050186 | A1* | 2/2013 | Large | H04N 13/0404 345/419 |
| 2013/0069933 | A1* | 3/2013 | Smithwick | G02B 27/2214 345/419 |
| 2013/0093861 | A1* | 4/2013 | Itoh | G02B 3/06 348/51 |
| 2013/0169704 | A1* | 7/2013 | Tanaka | G09G 3/3406 345/691 |
| 2013/0176303 | A1* | 7/2013 | Ek | H04N 13/0402 345/419 |
| 2013/0176406 | A1* | 7/2013 | Ek | H04N 13/0413 348/51 |
| 2013/0307948 | A1* | 11/2013 | Odake | H04N 13/32 348/59 |
| 2013/0321406 | A1* | 12/2013 | Harrold | G02B 6/0011 345/419 |

* cited by examiner

Component 1 represents light-emitting units, 2 represents light condenser, 3 represents the mirror, 4 represents the imaging lens, 5 represents the light refractive deflector, 6 represents the LCD screen, 7 represents the pupil tracker, 8 represents the viewing angle extender, 9 represents the directional optical module, 10 represents the LED light-emitting units array, 11 represents the emitted beam, 12 represents the flat fan-shaped beam, 13 represents the exit pupils, M represents the directional backlight module, I represents the virtual image point, Q represents the viewing area. U represents the object distance, V' represents the virtual image distance, V represents the best viewing distance, $t''$ represents the spacing distance between adjacent exit pupils, $t'$ represents the spacing distance between adjacent virtual image point, t represents the spacing distance between the adjacent light-emitting units, W represents the width of the exit pupils, d represents the width of each light-emitting unit, A, B represents the viewer's viewpoint.

UNASSISTED STEREOSCOPIC DISPLAY DEVICE USING DIRECTIONAL BACKLIGHT STRUCTURE

CROSS REFERENCE TO RELATED APPLICATION

This application is a National Phase application of, and claims priority to, PCT Application No. PCT/CN2014/07876, filed on May 29, 2014, entitled "UNASSISTED STEREOSCOPIC DISPLAY DEVICE USING DIRECTIONAL BACKLIGHT STRUCTURE", which claimed priority to Chinese Application No. 201310612559.5, filed on Nov. 27, 2013. Both the PCT Application and Chinese Application are incorporated herein by reference in their entireties.

1. TECHNICAL FIELD

This invention involves a kind of autostereoscopic display device, especially it provides the design of a new directional backlight structure, which belongs to the field of information display technology.

2. TECHNICAL BACKGROUND

Stereo display technology originates from 1830s, when Wheatstone put forward the concept of parallax 3D display theory. In the past 170 years, it has experienced many ups and downs ups. Since the 3D movie "Avatar" was released in 2010, more and more researchers and funds have been devoted on 3D display field. The main components and solutions related to 3D display include 3D chips, 3D panels, 3D coding transmission technology and the production of 3D contents, and its application foreground is immeasurably, such as these fields like entertainment, medical treatment, military, industrial design, advertising, etc.

The current method to realize 3D display can be divided into three categories: parallax 3D display, volumetric display and holographic display. Furthermore, parallax 3D display technology includes auxiliary and non-auxiliary 3D display, among which, the auxiliary display device usually requires users to wear glasses or helmets to see the 3D images, and furthermore, it will cause visual fatigue, due to these drawbacks, this kind of display devices are not welcomed in the product market. So far, non-auxiliary 3D display mainly refers to the grating type, which includes the slit grating, lenticular sheets grating, lattice grating and so on. However, this kind of display mode will cause the loss of image resolution, the decay of brightness, the requirement of multiple parallax images input and the discontinuous watching field for stereo view, due to all these drawbacks, it has poor practicability.

Currently, there are still some other multi-layer screen display method called integrated stereoscopic display, the Chinese patent CN201010252725.1 owned by Qionghua Wu publicly provide a full-resolution multi-view autostereoscopic display device based on grayscale screen, it achieves full resolution through the overlying of multi-layer screens. However, there exists the moire fringe between screens, the arguments of screens is not easy to change, and the stereo vision is not realistic, thus it is difficult to meet the requirements of universality.

In view of this background, the compact and full-resolution autostereoscopic display device available for multiple viewers will be able to attract market attention.

3. CONTENT OF INVENTION

The aim of this invention: to provide an autostereoscopic display device using directional backlight. The device uses a kind of directional backlight module to direct the left and right parallax images to the corresponding left and right eye time-sequentially with the aid of the eye tracker, so that this device could achieve continuous stereo viewing field and is compatible with 2D display.

The technology scheme of this invention: an autostereoscopic display device using directional backlight, is composed of the directional backlight module, the pupil tracker device and the control module, which will make the ordinary image displayer provide stereo vision. The stated directional backlight module includes the directional optical components and the addressable light engine, and the stated directional optical components are made up of the light condenser, the mirror, the light refractive deflector and the directional optical imaging module. The stated control module will make the light engine on or off synchronously with the left and right images refreshing rate for the directional optical imaging module to form left and right exit pupils alternately, so as to ensure that the viewer's left eye will only see the left image and the right eye will only see the right image, then the full resolution stereo vision is achieved.

The stated addressable light engine is composed of light-emitting array that includes a series of light-emitting elements and its driver circuits. Each light-emitting element is controllable to be lit on or off. The location of those light-emitting elements that needs to be lit is decided by the pupil location achieved by the eye tracker, multiple pairs of the light-emitting unit will converge through the directional optical components to form the left and right exit pupils to the viewer's corresponding eyes respectively.

Figure 1:
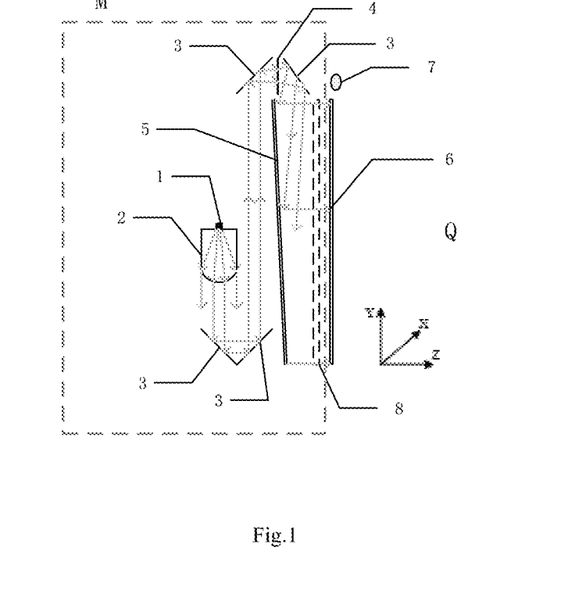
FIG. 1 side view of the overall structure of an embodiment example, the dotted line area represents the directional backlight module.

The stated directional optical components are composed of the light condenser, the mirror, the light refractive deflector and the directional optical imaging module, as FIG. 1 shows. Its main feature contains that the light condenser can compress the divergent light emitted from the light-emitting unit into parallel light or the nearly parallel light, while keeping the propagation direction unchanged. This parallel or nearly parallel light will form a flat fan-shaped beam, then the directional optical imaging modules will condense this beam to form the convergence beam window, which is called the viewing field. The main function of the mirror is to change the light propagation direction, so as to expand the optical path for the optical imaging modules to achieve better viewing windows of higher quality. The light refractive deflector will expand the light beam to cover the whole screen area while changing the propagation direction, the deflector is a reflective surface composed of a series of micro-structure units used to change the propagation direction of the fan-shaped beam, so that the beam traces along the direction perpendicular to the image displayer to light the whole screen. Combining the four major optical components, the directional convergent exit pupils can be produced, and the whole screen can be seen by the viewers.

Figure 2:
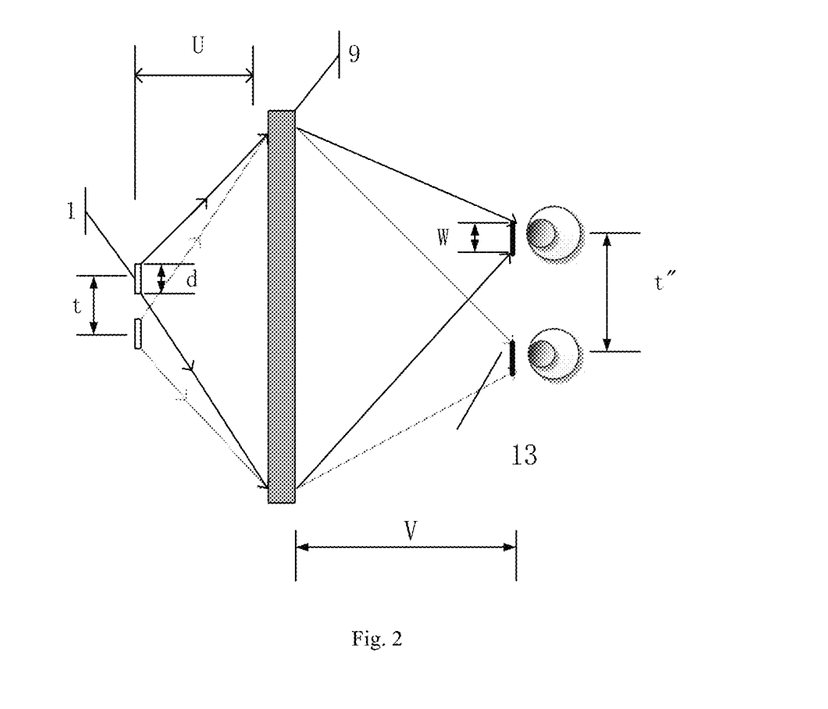
FIG. 2 the scheme diagram about how the optical module form the exit pupils.

The stated directional optical imaging module could converge light beam of different light sources from different places into different places (as shown in FIG. 2) to form the viewing window, and the width of exit pupils has a fixed ratio to the original size of the light source, the distance between exit pupils is also proportional to the distance between light emitting units, it has features as follows:

$$\frac{t''}{t} = \frac{W}{d} \equiv \text{constant} \qquad (1)$$

in the equation, t" represents the distance between exit pupils, t represents the distance between the light emitting units, W represents the width of the exit pupils, d represents the width of the light emitting units.

Figure 3:
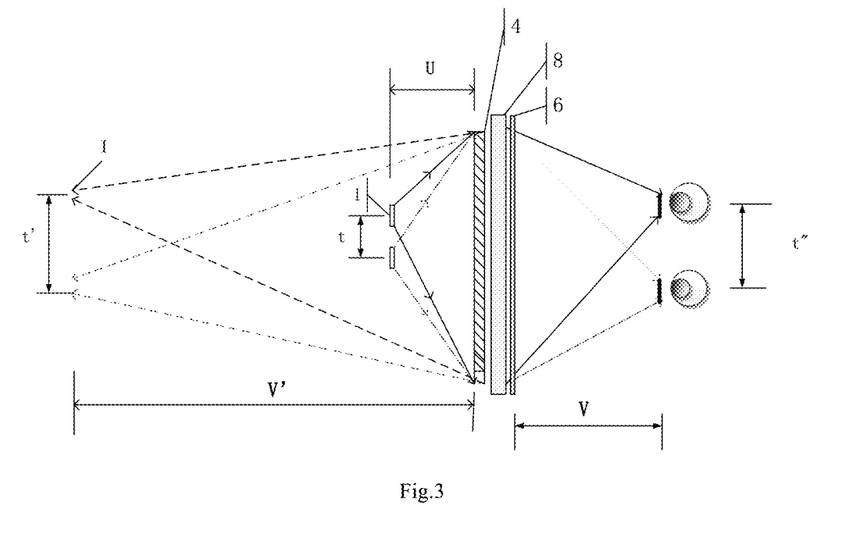
FIG. 3 simplified diagram of the whole optical path of this device.

The stated directional optical imaging modules are composed of the imaging lens and the viewing angle extender (as shown in FIG. 3). Its feature contains that the imaging lens will converge the light beam emitted by the light-emitting units and its reverse extension cords intersect at a distance more far from the imaging lens, and the virtual imaging point is located on the same side to the imaging lens; the viewing angle extender have the ability to converge objects far away into a much closer place, so the light emitted by the virtual imaging point can be brought together to the best viewing distance to form exit pupils, and it's ensured that the light illuminates the entire screen during its convergence process, so that the viewer can see the entire screen through the exit pupils. This module has the following optical properties:

$$\frac{t'}{t} = \frac{V'}{U} \qquad (2)$$

t"=t'     (3)

in the equation, t' represents the spacing between the enter point of the virtual images, t represents the distance between the light-emitting array unit, U represents the distance between the imaging lens and the light emitting units (which is the object distance), V' represents the horizontal distance between the virtual imaging points and the imaging lens, t" represents the spacing distance between the adjacent left and right exit pupils.

Furthermore, its special properties can be concluded as follows: 1) a large output angle will be produced with a small input angle when light goes through this device, and angular magnification takes place only in the horizontal direction; 2) input and output ray angles remain on the same side of the optical axis of the viewing angle extender; and 3) the image distance is proportional to the object distance, which means when the object distance becomes shorter, the image distance will become shorter too.

The stated eye tracker is to detect and locate the pupil's position of the viewer's eyes, so as to help the control module to determine the position of the light emitting units that needs to be lit. The module can detect and track the move of viewer's pupils nearly real-time, and can track multiple pairs of viewer's pupils, so as to provide the probability for multiple users to see stereo vision simultaneously.

The stated control module is responsible for the communication between the pupil tracker and the addressable light engine and deciding the on and off time sequence of the light emitting units. The control module obtains the viewer's pupil location from the pupil tracker, then inquiry the corresponding table which records the corresponding relationship between pupil location and the light-emitting units number, so as to decide which light-emitting units need to be lit. Meantime, based on the acquired left and right images' refreshing timing, it will control the time sequence of the corresponding left light-emitting units synchronously with the left image refreshing timing and the right is the same, in short, when the screen is showing the left image, then the corresponding left light-emitting units will be lit, when the screen is showing the right image, then the corresponding right light-emitting units will be lit. The light emitted from these units will form the viewing window through the directional optical imaging modules, as the left and right viewing window occur time sequentially, viewer's left eye will only see the left image and right eye will only see the right image, the images have no resolution loss.

The image displayer represents those electronically controlled display device that are capable of displaying color images, such as LCD, LED, plasma, etc.

The beneficial effects of this invention is: compared to current technology, its significant advantages are listed as follows:

1. images with high quality, and the 3D images are more realistic;
2. no need to wear glasses, helmets or other aided device;
3. stereo vision without distortion and resolution loss, strong stereo fidelity;
4. only need a pair of parallax images to acquire stereo viewing for multiple viewers, low requirement for data processing;
5. the adopted directional optical imaging module achieves good imaging quality, the formed viewing window is narrow enough to obtain low crosstalk;
6. this device is available for multiple users, and is switchable between 2D and 3D mode.

4. DESCRIPTION OF PICTURES

5. DETAILED EMBODIMENT EXAMPLE

In all the figures, 1 represents light-emitting units, 2 represents light condenser, 3 represents the mirror, 4 represents the imaging lens, 5 represents the light refractive deflector, 6 represents the LCD screen, 7 represents the pupil tracker, 8 represents the viewing angle extender, 9 represents the directional optical module, 10 represents the LED light-emitting units array, 11 represents the emitted beam, 12 represents the flat fan-shaped beam, 13 represents the exit pupils, M represents the virtual image point, Q represents the viewing area. U represents the object distance, V' represents the virtual image distance, V represents the best viewing distance, t" represents the spacing distance between adjacent exit pupils, t' represents the spacing distance between adjacent virtual image point, t represents the spacing distance between the adjacent light-emitting units, W represents the width of the exit pupils, d represents the width of each light-emitting unit, A, B represents the viewer's viewpoint.

Take the ordinary liquid crystal display screen as the basic display device, a detailed description of one embodiment of this invention is illustrated here. It is necessary to point out that this embodiment example is helpful to further illustrate the present invention, but it can not be understood as the limitation to the protection scope of this invention. Some unessential improvements or adjustments to the present invention according to the invention described above will still be within the scope of this invention.

An autostereoscopic display device using directional backlight module, is composed of the directional backlight module, the pupil tracker, the control module and the image displayer. The stated directional backlight module includes the directional optical components and the addressable light engine, and the stated directional optical components are made up of the light condenser, the mirror, the light refractive deflector and the directional optical imaging module. The stated directional optical imaging modules are composed of the imaging lens and the viewing angle extender, the imaging lens will converge the light beam emitted by the light-emitting units and its reverse extension cords intersect at a distance more far from the imaging lens, the viewing angle extender have the ability to converge objects far away into a much closer place, so the light emitted by the virtual imaging point can be brought together to the best viewing distance to form exit pupils, and it's ensured that the light illuminates the entire screen during its convergence process, so that the viewer can see the entire screen through the exit pupils. Through those two optical components, the scattered light emitted from the light-emitting source will converge in the horizontal direction to form the needed exit pupils, under the aid of the control module, the exit pupils are produced time sequentially to ensure that on a specific moment, only the viewer's left eye or the right eye will see the corresponding parallax image, what's more, the alternate frequency is fast enough for viewer to not feel the flicker.

Figure 4:
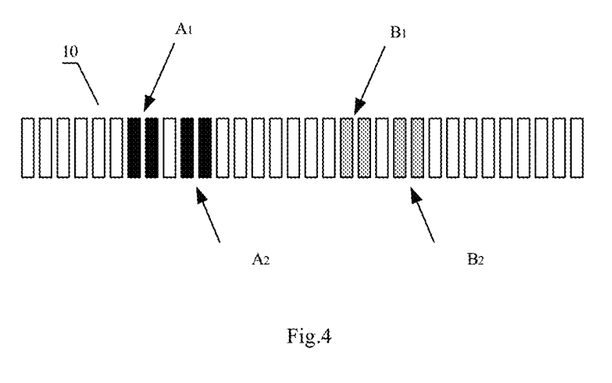
FIG. 4 arrangement of the light-emitting units array.
Figure 5:
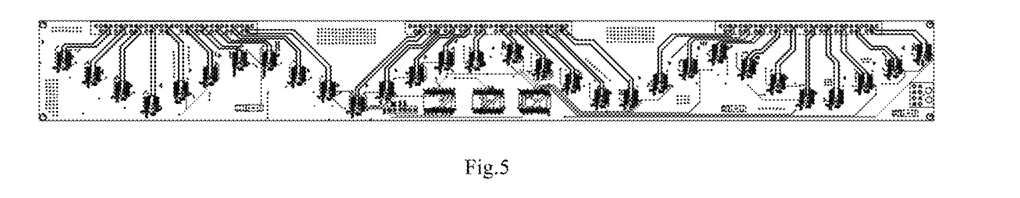
FIG. 5 the circuit diagram of the addressable light engine.
Figure 6:
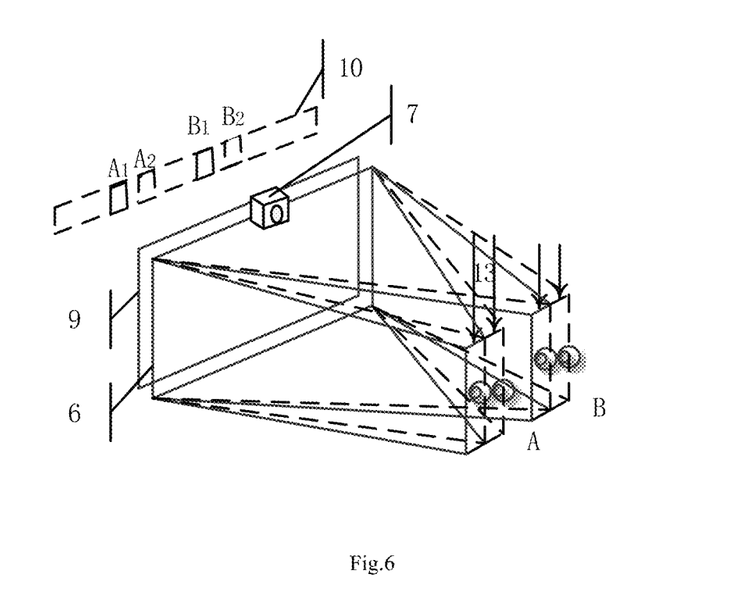
FIG. 6 system overall schematic diagram when there are two viewers.

Based on the above principle, the stated addressable light engine consists of a series of light-emitting elements and the driver circuits, in this embodiment example, the light-emitting units array can be the closely arranged hi-lite LEDs with small size (as shown in FIG. 4), its driver circuits can make each LED to be lit or off through the constant current chip TLC5927, it driver circuit structure is shown in FIG. 5; FIG. 6 shows the system overall schematic diagram when there are two viewers. When the LCD is showing the left image, the LEDs corresponding to the two viewers' left eyes on the LED array will be lit, which corresponds to the area $A_1$, $B_1$ in the FIG. 4, then will form the narrow exit pupils to where the each viewer's left eye is through the directional optical imaging module; when the LCD is showing the right image, the LEDs corresponding to the two viewers' right eyes on the LED array will be lit, which corresponds to the area $A_2$, $B_2$, then will form the narrow exit pupils to where each viewer's right eye is.

Figure 7:
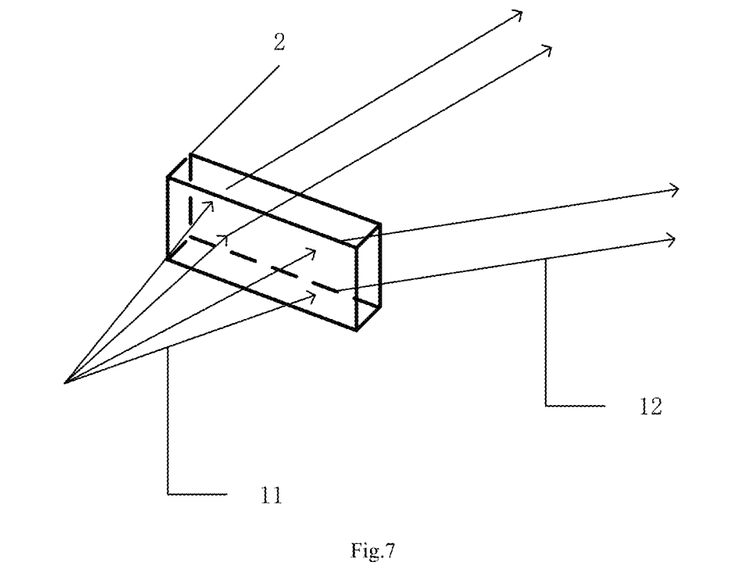
FIG. 7 optical performance of the light condenser.
Figure 8:
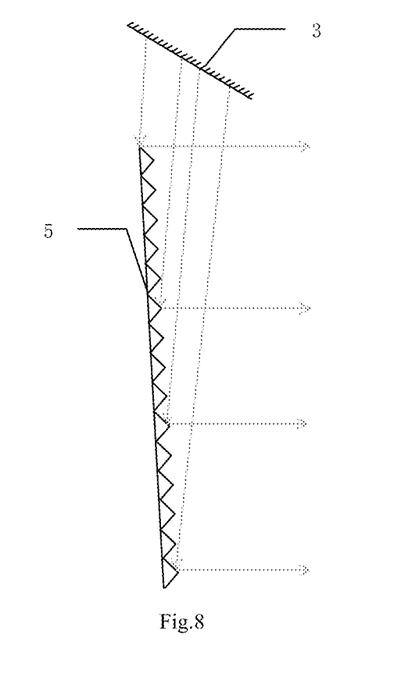
FIG. 8 refraction effect of the light refractive deflector.

In this embodiment example, the stated light condenser (component 2) will compress the light beam only in one direction, for example, we can use the lenticular lens, as shown in FIG. 7, its main function is to compress the divergent light in YZ plane emitted from the LEDs into parallel light or the nearly parallel light, so that the light can pass through the narrow imaging lens (component 4); the stated light refractive deflector (component 5), its surface is neatly arranged by micro-structure units, as FIG. 8 shows, its main role is to change the light propagation direction along the Y to propagate along the Z direction in FIG. 1.

Figure 9:
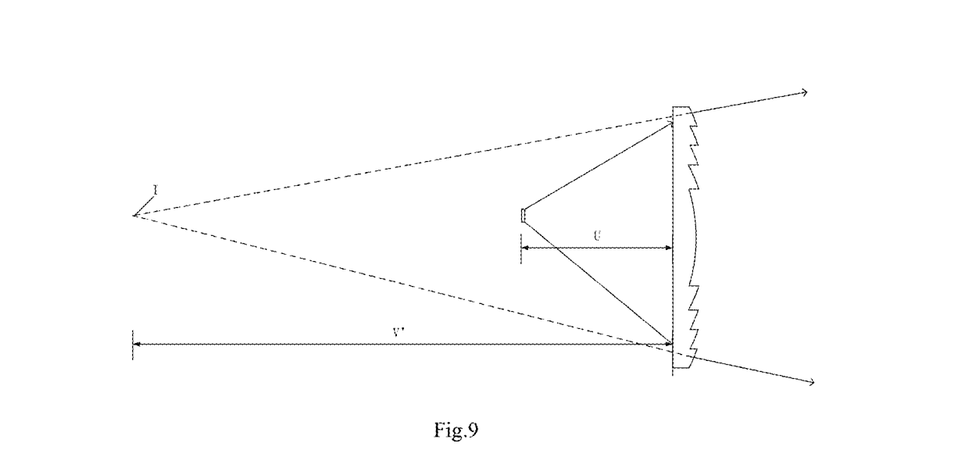
FIG. 9 imaging property of the Fresnel lens.

In this embodiment example, the stated directional optical imaging lens can be replaced as the linear Fresnel, and it is used to form virtual images. Fresnel lens is a convex lens similar to ordinary lens, but has a much thinner structure, it meets the imaging properties while reducing the volume and the weight. In this embodiment example, the linear Fresnel lens will only converge the light in XZ plane, while keeping the light propagation feature in other dimension unchanged, as shown in FIG. 9. The LEDs is placed within the focal length, so it will form virtual images more far away on the same side of the Fresnel lens. Furthermore, when the LEDs are placed in different places, the virtual images will be in different places. The virtual image distance V' has the relationship with the object distance U as follows:

$$\frac{1}{-V'} + \frac{1}{U} = \frac{1}{f} \tag{4}$$

among which, f is the focal length of Fresnel lens, in this embodiment example, U=600 mm, V'=3259 mm, f=735 mm.

Figure 10:
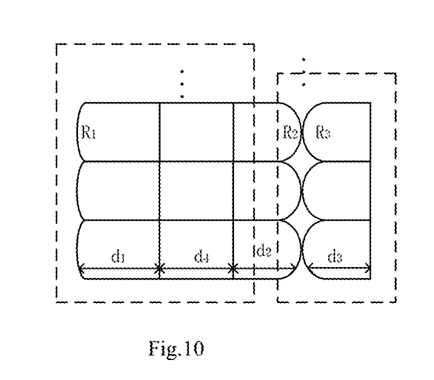
FIG. 10 components of the viewing angle extender.
Figure 11A:
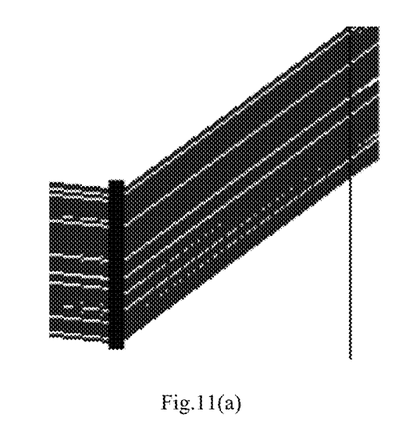
FIG. 11(a) angle zoom simulation of the viewing angle extender.
Figure 11B:
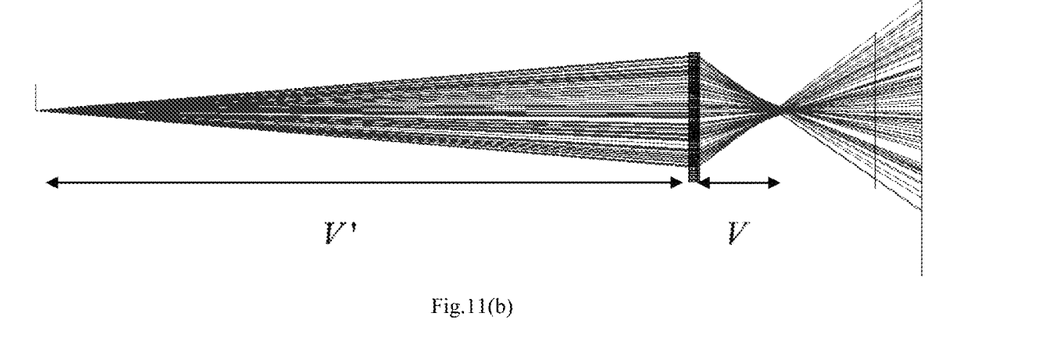
FIG. 11(b) imaging characteristics of the viewing angle extender.
Figure 12:
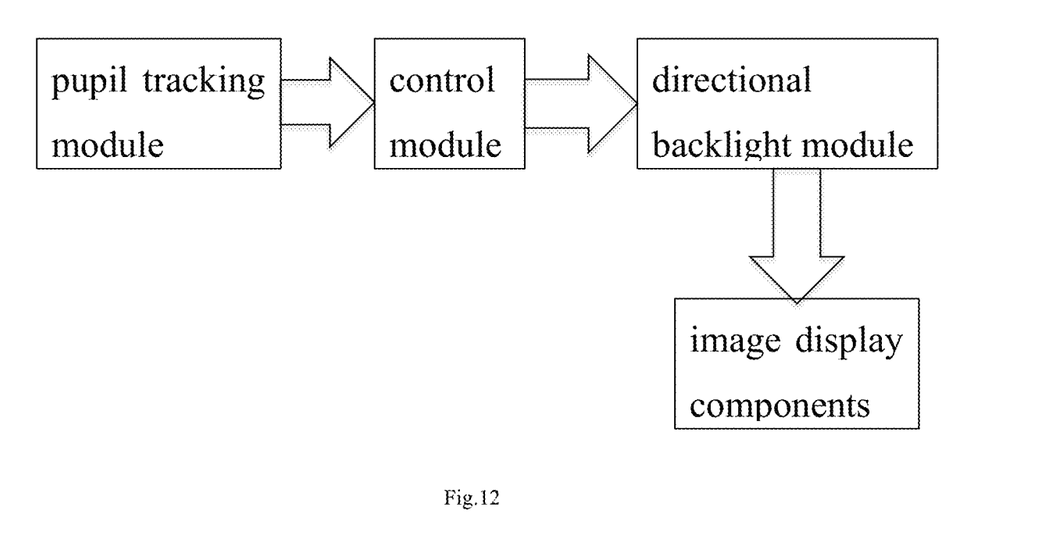
FIG. 12 the control flow chart of the control module.

In this embodiment example, the stated viewing angle extender is an optical device which has the function of angle magnifying, it can change the small input angle into the large output angle, its structure consists of multiple layers of lenticular sheets, as shown in FIG. 10. When the input light beam is parallel with some certain inclination, the exit rays' inclination angle will be much larger and they remain the same side of the optical axis, as shown in FIG. 11(a); when the incident rays are emitted from a distant light source, then this device will converge the rays to a much closer place, as shown in FIG. 11(b). The magnification ratio is equal to the ratio of the object distance to the image distance, which has the relationship as equation (5):

$$\frac{V'}{V} = \text{ratio} \tag{5}$$

In this equation, V' represents the distance between the object and the viewing angle extender, V represents the distance between the imaging point and the angle extender, which is the best viewing distance, ratio is the angle magnification value. In this embodiment example, the ratio is 6.5.

In this embodiment example, the eye tracker is a combination of software and hardware devices, the hardware devices contains a lot of infrared LEDs and one camera, it takes advantage of human's bright pupil effect, which is the feature that when light illuminate on people's face, human pupil will reflect the light back to the original source, we make the infrared LEDs lit every other frame, then the camera will capture two pictures which are almost the same except one has the bright pupil effect, we substrate these two pictures to get the brighter points as the candidate position of human pupil, then the SVM and Adaboost algorithm will be used to precisely locate the pupil position.

In this embodiment example, the stated pupil detection algorithm mainly involves the popular eye location and detection algorithm based on the PC or DSP platform, including the candidate area generation algorithm with active illumination, Real Adaboost face detection and tracking algorithm, SVM (Support Vector Machine) eye location algorithm with Haar feature, and the balanced Kalman filter algorithm used to improve the location accuracy of human eye. This module is responsible for obtaining the pupil position.

Pupil tracking and detecting is a systematic module combining software and hardware, it involves the knowledge of image processing, signal processing, programming skills and circuits design, the available algorithms can be described as follows:

1. Face location and filtering. Adaboost algorithm based on features is commonly used to realize face location, through training, a number of characteristics with better performance is achieved to form cascades strong classifier. Based on the pupil candidate point and the common rules of face organ arrangement, it will search every possible face region with different scale, then the threshold value comparison method is used to determine whether the region belongs to human face. After locating the face region based on the several Haar features used in AdaBoost algorithm, the filtering algorithm will be used to optimize the face region. There are many commonly used filtering algorithms, for example, Kalman filtering, wavelet filtering algorithm. Furthermore, it can also use methods based on knowledge, template matching or appearance to locate human face region.

2. Pupil location and optimization. Pupil location methods can also involve methods based on knowledge, features, template matching or appearance. Take the support vector machine (SVM) method based on appearance as an example, firstly, choose several types of Haar features as feature space, grid search, weighted balance of cross-validation error rate and SVM training method is used to achieve the corresponding weight coefficient, which portrays a hyperplane, then the hyperplane is made use of to detect the pupil area within the candidate regions to determine whether the region corresponds to human pupil. After locating the pupil area, template matching and inter-frame correlation calculation method can be used to optimize the location of the pupil area. Commonly used calculation methods include the minimum mean square deviation algorithm.

3. Viewer's pupil tracking Based on the pupil positions located in current and previous frame, some correlation tracking algorithm can be used to predict the possible pupil position of next frame, pupil detection will be directly done on these positions without face detection, which will save time for the pupil location process of next frame.

In this embodiment example, the control is realized through the AVR MCU, it combines the stated addressable light engine and the pupil tracker, the control obtains the pupil position from the pupil tracker through RS232 serial port to decide which LEDs should be lit. Meantime, the synchronization signal extracted from the DVI video stream is used to decide the lit LED's timing sequence. Its flow chart showing the logic relationship is shown in FIG. 9.

While the invention has been revealed as the preferred embodiment, it is not intended to limit the present invention. Some people doing research in this field is allowed to do some change or adjustment without departing from the spirit and the scope of this invention. Accordingly, the protection scope of this invention is to be defined as the right claim.

As FIG. 1 shows, the light propagation direction follows the following sequence: Light emitted from component 1 (light-emitting units) goes through component 2 (light condenser), which will concentrate the divergent light in YZ plane into parallel light, then the light would be reflected by three mirrors (component 3) so that the light propagation direction can be changed by 90°, then the light will go through component 4 (the imaging lens), after that, using another mirror (component 3) to change light propagation direction with the aid of component 5 (light refractive deflector) which acts as a light reflector to make the light direction goes along axis Z, then the light would go through component 8 (viewing angle extender), after that, the light beam will propagate along axis Z to a converge viewing window, what's more, before light gathered in one place, it would cover all the area of component 6 (LCD screen), so that people locating in the viewing window could see the whole area of the LCD screen.

Component 1 represents light-emitting units, 2 represents light condenser, 3 represents the mirror, 4 represents the imaging lens, 5 represents the light refractive deflector, 6 represents the LCD screen, 7 represents the pupil tracker, 8 represents the viewing angle extender, 9 represents the directional optical module, 10 represents the LED light-emitting units array, 11 represents the emitted beam, 12 represents the flat fan-shaped beam, 13 represents the exit pupils, M represents the directional backlight module, I represents the virtual image locations from where light appears to have converged after the effect performed by Component 4 (imaging lens), Q represents the viewing area. U represents the distance between Component 1 (light-emitting units) and Component 4 (imaging lens), V' represents the distance between Component 4 (the imaging lens) and Component I (virtual image locations), V represents the best viewing distance which represents the distance between the light converging area and Component 8 (angle), t" represents the distance between adjacent exit pupils, t' represents the distance between adjacent virtual image (Component I), t represents the distance between the adjacent light-emitting units (Component 1), W represents the width of the exit pupils, d represents the width of each light-emitting unit, A, B represents the viewer's viewpoint. The viewing angle extender (component 8), positioned in between lighting emitting units (component 1) and the LCD screen (component 6), at a distance more than U away from lighting emitting units (component 1), wherein the viewing angle extender (component 8) consists of multiple layers of lenticular sheets. In the embodiment illustrated in FIG. 8, the viewing angle extender (component 8), each lenticular sheet is consisting of three lens and a middle thin layer. Each lens has a curved face and flat face. The middle thin layer has two flat faces.

What is claimed is:

1. An autostereoscopic display device using directional backlight to make ordinary 2D image displayer provide stereo vision, having
   a directional backlight module,
   a pupil tracker device and a control module, wherein
      said directional backlight module includes directional optical components and an addressable light engine;
      based on a time-multiplexing principle, the 2D image displayer displays left and right parallax images alternately;
      wherein a video stream field synchronization signal decides lit timing sequence of the addressable light engine, when a LCD screen (component 6) is showing left image, only the corresponding left light-emitting units are lit, and when the LCD screen (component 6) screen is showing right image, only the corresponding right light-emitting units are lit; and wherein
  directional optical components, including a light condenser (component 2), multiple mirrors (component 3), a light refractive deflector (component 5) and a viewing angle extender (component 8), will converge the light rays emitted from the light-emitting units to produce viewing window, so as to ensure that a viewer's left eye only sees the left image and the right eye only sees the right image, wherein the autostereoscopic display device offers stereo vision without distortion or resolution loss;
  said addressable light engine is composed of a light-emitting array that includes a series of light-emitting elements and its driver circuits wherein each light-emitting element is controllable to be lit on or off based on pupil location information obtained from the pupil tracker, the corresponding light-emitting units will be lit, then multiple pairs of the light-emitting units will converge through directional optical imaging module (components 4 and 8) to form the left and right exit pupils to the viewer's corresponding eyes respectively, and each light-emitting element is a LED;
  the viewing angle extender (component 8),
    positioned in between light-emitting units (component 1) and the LCD screen (component 6), wherein a distance from light-emitting units (component 1) to the viewing angle extender (component 8) is greater than distance U, which is a distance between an imaging lens (component 4) and lighting emitting units (component 1), and the viewing angle extender (component 8) consists of multiple layers of lenticular sheets, each lenticular sheet is consisting of three lens and a middle thin layer;
  the directional optical imaging module (components 4 and 8) is an assembly of an imaging lens (component 4) and the viewing angle extender (component 8),
  and the directional optical imaging module is positioned at a distance U from the light-emitting units (component 1) and LCD screen (component 6), with the imaging lens (component 4) receiving lights from the light-emitting units (component 1) and the viewing angle extender (component 8) directing light to the LCD screen (component 6).

2. The autostereoscopic display device according to claim 1, characterized in that micro-structure units are arranged on a surface of the light refractive deflector (component 5), to change a light propagation direction.

3. The autostereoscopic display device using the directional backlight module according claim 2 characterized in that imaging lens in the directional backlight module can converge the light beam emitted by the light-emitting units and reverse extension cords of the directional backlight module intersect at a distance farther from the imaging lens, and a virtual imaging point is located on the same side to the imaging lens; and light sources of different places will converge to different places.

4. The autostereoscopic display device using the directional backlight module according to claim 1, wherein
  the directional optical imaging module can converge light beam of a light source from a first place into a second place, which is different from the first place to form the viewing window, and a width W of exit pupils has a fixed ratio to an
  original size of the light source, a distance t" between exit pupils is proportional to a distance t between light-emitting units, wherein the distance between exit pupils, the distance between the light-emitting units, the width of the exit pupils, and the width d of the light-emitting units meet the following requirements:

$$\frac{t''}{t} = \frac{W}{d} \equiv \text{constant} \tag{1}$$

wherein the directional optical imaging modules (components 4 and 8) characterized in that
  the imaging lens (component 4) can converge light beam emitted by the light-emitting units (component 1) together with reverse extension lines intersect at a virtual imaging point (component I), a position far from the imaging lens, having a virtual imaging point (component I) and light-emitting units (component 1) located on a same side of the image lens (component 4);
  the viewing angle extender (component 8) have the ability to converge light emitted far away into a much closer place, so the light emitted at the virtual imaging point (component I) can be brought together to viewing distance to form exit pupils, and it's ensured that the light illuminates the entire LED screen (component 6) during its convergence process, so that the viewer can see the entire LED screen through the exit pupils;
  wherein a distance t' between enter points of the virtual images,
    a distance t between the light-emitting,
    a distance U between the imaging lens and the light-emitting units,
    a horizontal distance V' between the virtual imaging points and the imaging lens, and a distance t" between the adjacent left and right exit pupils meet the required relationship in equations (2) and (3):

$$\frac{t'}{t} = \frac{V'}{U} \tag{2}$$

$$t''=t' \tag{3}$$

5. The autostereoscopic display device using the directional backlight module according to claim 4, wherein the viewing angle extender, positioned between the imaging lens (component 4) and the LCD screen (component 6) is an optical device which has the function of angle magnifying and can change light with a small input angle into light with a large output angle, when the input light beam is parallel with inclination, the exit rays' inclination angle will be much larger and they remain the same side of the optical axis; when the incident rays are emitted from a distant light source, then this device will converge the rays to a much closer place, the magnification ratio has the relationship as equation (5):

$$\frac{V'}{V} = \text{ratio} \tag{5}$$

wherein V' represents the distance between virtual image point (component I) the imaging lens, V represents the distance between the imaging point and the angle extender, which is a viewing distance, ratio is an angle magnification value.

6. The autostereoscopic display device using the directional backlight module according to claim 1, characterized in that said control module is responsible for the communication between the pupil tracker and the addressable light engine to obtain the viewer's pupil location to decide which light-emitting units to be lit; based on the acquired left and right images' refreshing timing protocols, a time sequence of the corresponding left light-emitting units is used to synchronize with the left image refreshing timing protocol and the right is the same, when the screen is showing the left image, then the corresponding left light-emitting units will be lit, when the screen is showing the right image, then the corresponding right light-emitting units will be lit; light rays emitted from these units can form a viewing window through the directional optical components.

7. The autostereoscopic display device using the directional backlight module according to claim 1 characterized in that imaging lens in the directional backlight module can converge the light beam emitted by the light-emitting units and its reverse extension cords of the directional backlight module intersect at a distance farther from the imaging lens, and a virtual imaging point is located on the same side to the imaging lens; and light sources of different places will converge to different places.

\* \* \* \* \*